(12) United States Patent
Desmeules (10) Patent No.: US 9,188,368 B2
(45) Date of Patent: Nov. 17, 2015

(54) GEOTHERMAL FLEXIBLE CONDUIT LOOP SINGLE PASS INSTALLATION SYSTEM FOR DENSE SOILS AND ROCK

(75) Inventor: Alain Desmeules, Montreal (CA)

(73) Assignee: Brooke Erin Desantis, Montreal, Quebec ( * ) Notice: Subject to any disclaimer, the term of this patent is extended or adjusted under 35 U.S.C. 154(b) by 574 days.

(21) Appl. No.: 13/488,666

(22) Filed: Jun. 5, 2012

(65) Prior Publication Data

US 2012/0282032 A1  Nov. 8, 2012

Related U.S. Application Data

(63) Continuation-in-part of application No. 12/320,754, filed on Feb. 4, 2009.

(51) Int. Cl.
| | |
|---|---|
| *F24J 3/08* | (2006.01) |
| *F03G 7/04* | (2006.01) |
| *E21B 7/20* | (2006.01) |
| *F25B 30/06* | (2006.01) |

(52) U.S. Cl.
CPC . *F24J 3/083* (2013.01); *E21B 7/20* (2013.01); *F03G 7/04* (2013.01); *F24J 2003/088* (2013.01); *F25B 30/06* (2013.01); *Y02E 10/125* (2013.01)

(58) Field of Classification Search
CPC ................................................. F24J 2003/088
USPC ............ 165/45; 405/184, 232, 253, 255, 249; 173/53, 54, 55, 34
See application file for complete search history.

(56) References Cited

U.S. PATENT DOCUMENTS

| | | | | |
|---|---|---|---|---|
| 3,899,891 | A | * | 8/1975 | Kelly et al. .................... 405/251 |
| 4,286,651 | A | * | 9/1981 | Steiger et al. .................... 165/45 |
| 4,679,637 | A | * | 7/1987 | Cherrington et al. ........... 175/61 |
| 4,785,885 | A | * | 11/1988 | Cherrington et al. ......... 166/285 |
| 5,040,926 | A | * | 8/1991 | Andreasson .................. 405/232 |
| 5,209,605 | A | * | 5/1993 | Cherrington ................. 405/184 |
| 5,435,395 | A | * | 7/1995 | Connell ........................ 166/384 |
| 5,590,715 | A | * | 1/1997 | Amerman ..................... 166/290 |
| 5,642,964 | A | * | 7/1997 | DeMasters ................ 405/184.4 |
| 5,758,724 | A | * | 6/1998 | Amerman ..................... 166/290 |
| 5,816,314 | A | * | 10/1998 | Wiggs et al. .................... 165/45 |
| 6,041,862 | A | * | 3/2000 | Amerman ..................... 166/290 |
| 6,250,371 | B1 | * | 6/2001 | Amerman et al. .............. 165/45 |
| 6,672,371 | B1 | * | 1/2004 | Amerman et al. .............. 165/45 |

(Continued)

FOREIGN PATENT DOCUMENTS

| | | | | |
|---|---|---|---|---|
| BE | | 1016899 | 9/2007 | |
| DE | | 3114262 A1 | * 11/1982 | ................ F24J 3/02 |

(Continued)

*Primary Examiner* — Marc Norman
*Assistant Examiner* — Devon Russell
(74) *Attorney, Agent, or Firm* — Norton Rose Fulbright Canada (57) ABSTRACT

A geothermal flexible conduit loop single pass installation system for dense soil or rock. A conduit loop attachment is secured behind the soil penetrating head and has an engageable element adapted to hook a loop end portion of a flexible conduit loop and draw the conduit loop in a bore hole as it is being formed by the soil penetrating head as it descends in a soil under the influence of a downward force applied to a hollow force transmission shaft. A pressurized medium is released in the bore hole as it is formed. At least the force transmission is withdrawn with the flexible conduit loop retained in the bore hole by surrounding soil or a cement released through the shaft as it is withdrawn.

19 Claims, 5 Drawing Sheets

(56) References Cited

U.S. PATENT DOCUMENTS

| | | | |
|---|---|---|---|
| D488,486 S * | 4/2004 | Hibbs | D15/28 |
| 6,860,320 B2 * | 3/2005 | Johnson et al. | 165/45 |
| 6,920,924 B2 * | 7/2005 | Roesch et al. | 166/71 |
| 7,017,650 B2 * | 3/2006 | Johnson et al. | 165/45 |
| 7,048,037 B2 * | 5/2006 | McNair | 165/45 |
| 7,213,649 B2 * | 5/2007 | McNair et al. | 166/302 |
| 7,380,605 B1 * | 6/2008 | Wolf | 166/302 |
| 7,976,243 B2 * | 7/2011 | Rohde et al. | 405/184 |
| 8,016,049 B2 * | 9/2011 | Wurm et al. | 175/19 |
| D648,835 S * | 11/2011 | Ruot | D23/259 |
| 8,256,531 B1 * | 9/2012 | Biggs et al. | 175/15 |
| 8,365,841 B2 * | 2/2013 | Dimitroff | 175/53 |
| 8,398,034 B2 * | 3/2013 | Lambert et al. | 248/68.1 |
| 8,408,318 B2 * | 4/2013 | Kriesels | 166/384 |
| 8,444,346 B2 * | 5/2013 | Talkin | 405/184 |
| 8,529,156 B2 * | 9/2013 | Biggs et al. | 405/184 |
| 8,596,916 B2 * | 12/2013 | Rohde et al. | 405/184 |
| 8,684,095 B2 * | 4/2014 | Pullman et al. | 166/381 |
| 8,714,237 B2 * | 5/2014 | Alexander | 165/45 |
| 2004/0031585 A1 * | 2/2004 | Johnson et al. | 165/45 |
| 2004/0194914 A1 * | 10/2004 | Johnson et al. | 165/45 |
| 2004/0238183 A1 | 12/2004 | Roesch et al. | |
| 2009/0165992 A1 * | 7/2009 | Song | 165/45 |
| 2011/0002740 A1 * | 1/2011 | Desmeules | 405/184.4 |
| 2012/0175077 A1 * | 7/2012 | Lehmann et al. | 165/45 |
| 2012/0285657 A1 * | 11/2012 | Rudolf | 165/45 |

FOREIGN PATENT DOCUMENTS

| | | | |
|---|---|---|---|
| EP | 0096622 | | 12/1983 |
| EP | 1006322 | | 6/2000 |
| GB | 678494 | | 9/1952 |
| GB | 2436582 A | * | 10/2007 |
| NL | 1006037 | | 1/1999 |

* cited by examiner

GEOTHERMAL FLEXIBLE CONDUIT LOOP SINGLE PASS INSTALLATION SYSTEM FOR DENSE SOILS AND ROCK

CROSS-REFERENCE TO RELATED APPLICATION

This is a continuation-in-part of application Ser. No. 12/320,754, filed on Feb. 5, 2009, and entitled "System and method for geothermal conduit loop in-ground installation and soil penetrating head thereof".

TECHNICAL FIELD

The present invention relates to a geothermal flexible conduit loop single pass installation system for dense soils and rock.

BACKGROUND ART

In the parent patent application, I describe the construction of a soil penetrating head of various configurations which is driven into the soil and simultaneously draws a geothermal conduit loop. The soil penetrating head and conduit loop remain in the soil after it is driven thereinto by a force transmitting shaft, such as driven by a drill or a percussion apparatus. This method of disposing conduit loops into the ground greatly facilitates the installation of the loop in soft soil and reduces costs considerably.

In my U.S. application Ser. No. 12/497,560, filed on Jul. 3, 2009, and entitled "Soil Penetrating Plate Assembly To Position Geothermal Conduit Loops In Soil", I disclose other embodiments of soil penetrating plate assemblies to draw the flexible geothermal conduit loops into the soft soil and to release them therein. With many of these installation procedures, the boring head and the soil penetrating plates to which the conduit loops are attached are simply left buried into the soft soil by detaching the force transmission shaft assembly therefrom. This has proven to be a good procedure for soft soil conditions but not feasible for hard soils where a drill head is required to bore into the soil.

When boring in dense soil and rock, the procedure to install geothermal conduits is to firstly bore a hole and retract the drill head and install a conduit loop hook to draw a conduit loop in the bore hole and again retract the shaft and head attachment. A filler material, such as cement, is then introduced in the bore hole. This is a time consuming task as these bore holes may be up to 500 feet deep and the shaft may be in five foot sections requiring at least two assemblies and disassemblies. Such installations are therefore very costly. Also, if the cement is injected from the bottom, another conduit needs to be positioned in the bore hole and retracted slowly as cement is injected in the bore hole.

SUMMARY OF INVENTION

It is therefore a feature of the present invention to provide a geothermal flexible conduit loop single pass installation system wherein the boring head and the attachment device to draw the conduit loops can be withdrawn from the soil without damaging the conduit loops released in the bored hole.

Another feature of the present invention is to provide a geothermal flexible conduit loop single pass installation system for dense soil or rock equipped with a boring head capable of boring a hole in hard soil or rock while simultaneously releasing a pressurized medium from the boring head into the soil to facilitate displacement of the boring head and one or more flexible conduit loops drawn behind the boring head as it bores into the soil. The pressurized medium also cools the boring head, evacuates the drilled soil out of the bore hole and injects fluid streams to maintain the bore hole open.

Another feature of the present invention is to provide a geothermal flexible conduit loop single pass installation system for dense soil or rock wherein a pressurized bentonite cement solution is injected into the bore hole from the soil penetrating head as the head is retracted to the top of the bored hole.

According to the above features, from a broad aspect, the present invention provides a geothermal flexible conduit loop single pass installation system for dense soil or rock comprised of a hollow force transmission shaft having a soil penetrating head secured to a boring end of the shaft. Conduit means is provided in the soil penetrating head in communication with a passageway formed in the hollow force transmission shaft for the passage of pressurized medium therein. Attachment means is secured behind the soil penetrating head and has hook means adapted to hook a loop end portion of a flexible conduit loop and draw same in a bore hole being formed by the soil penetrating head as it descends in the soil under the influence of a downward force applied to the hollow force transmission shaft and a boring displacement of the soil penetrating head. The medium is being released in the bore hole through the soil penetrating head as the bore hole is being formed. Means is provided to withdraw the hollow force transmission shaft, the soil penetrating head and the attachment means without interference with the flexible conduit loop drawn into the bore hole whereby the flexible conduit loop remains in the bore hole by surrounding soil and/or a pressurized medium released in the bore hole.

According to a further broad aspect of the present invention, there is provided a method of installing a geothermal flexible conduit loop in dense soil or rock in a single pass, the method comprising the steps of: 1) providing a hollow force transmission shaft having a soil penetrating head secured to a boring end of the shaft, conduit means in the soil penetrating head in communication with a passageway formed in the hollow force transmission shaft for the passage of a pressurized medium therein, attachment means secured behind the soil penetrating head and having engageable means adapted to engage a loop end portion of a flexible conduit loop, ii) boring a hole in the soil and simultaneously drawing the flexible conduit loop spaced behind the soil penetrating head and engaged by the attachment means, and iii) withdrawing the force transmission shaft and at least the attachment means, the step of withdrawing also including simultaneously disengaging the attachment means from the loop end portion, the flexible conduit loop being installed in the bore hole simultaneously with the step (ii) whereby the boring and conduit loop installation is effected simultaneously in a single pass of the soil penetrating head in the soil.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
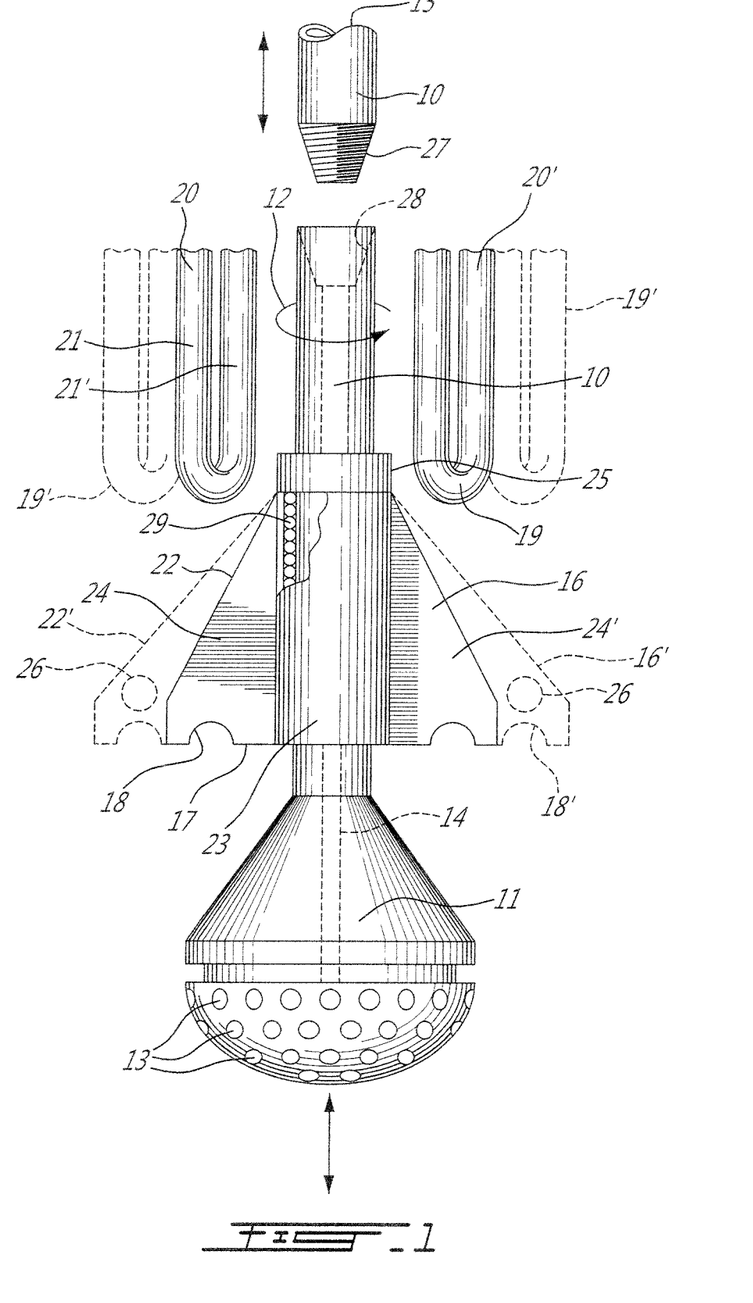
FIG. 1 is a fragmented end view illustrating the basic component parts of the geothermal flexible conduit loop installation system and comprised of a soil penetrating head, a conduit loop attachment soil penetrating plate, a pair of conduit loop end portions and a hollow force transmission shaft.

A preferred embodiment of the present invention will now be described with reference to the accompanying drawings in which FIG. 1 illustrates the basic component parts of the geothermal flexible conduit loop installation system. The system comprises a hollow force transmission shaft 10 which is connected to a soil penetrating boring head 11 secured to a boring end of the shaft. The soil penetrating head 11 is rotated by the hollow force transmission shaft, as indicated by arrow 12 and percussions may also be transmitted into the shaft, in a manner well known in the art, whereby the soil penetrating head will bore into dense soil or rock. As hereinshown, the soil penetrating head 11 is provided with a plurality of small conduits 13 through which a pressurized medium exits whereby to loosen and displace the soil or rock particles as the soil penetrating head bores into the dense soil or rock and rotated by a suitable drive, also well known in the art. The soil penetrating head is also provided with a conduit 14 which connects to a passageway 15 provided in the hollow shaft for the passage of a pressurized medium. Abrasive means is usually embedded in the outer surface of the head.

As also shown in FIG. 1, an attachment means, herein in the form of a soil penetrating plate 16, is secured behind the soil penetrating head and is provided in a lower edge 17 thereof with a hook formation 18. The hook formation 18 is dimensioned to hook a loop end portion 19 of a flexible conduit loop, as described in my aforesaid U.S. patent Applications, and draws the loop from a top end of a bore hole into the bore hole being formed by the soil penetrating head as it descends into the soil under the influence of a downward force applied to the hollow force transmission shaft 10. As the bore hole is being formed, the conduit loop is being installed in a single operation or single pass of the boring assembly.

As shown in solid lines in FIG. 1, the loop end portion 19 of the flexible conduit loop 20, only a lower portion being shown herein, is drawn behind the soil penetrating head 11. Therefore, when the soil penetrating head 11 is withdrawn from the bore hole, as will be described later with reference to FIG. 6, the soil penetrating head 11 would contact the loop end portion 19 of both flexible conduit loops 20 and 20' and this may cause damage to the conduit loop. In order to overcome this problem, the soil penetrating plate is extended to its configuration as shown in phantom lines indicated by reference numeral 16' whereby the hook formation 18' is disposed outside the outer periphery of the soil penetrating head 11. This is workable when the soil density permits the bore hole to be made of larger diameter and the boring head by the pressure of the medium, herein water, released under pressure and excavating the soil surrounding the bore head. Therefore, the conduit loop end portions as shown at 19' are spaced apart sufficiently whereby the soil penetrating head may be withdrawn without interference with the conduit loops. When it is withdrawn, the soil penetrating plates 16' are located in the spacing between the opposed conduits 21 and 21' of the flexible conduit loops 20 and 20' and therefore will not damage the conduit loops.

As hereinshown, the soil penetrating plates 16' have a slope top leading edge 22' to facilitate the withdrawing thereof in the bore hole. The leading edge 22' may also be sharpened to facilitate this withdrawing. Further, these soil penetrating plates are secured to the hollow force transmission shaft 10 by a sleeve 23 provided with a bearing support connection 29 whereby rotation of the force transmission shaft 10 is not transmitted to the soil penetrating plates 16'. As hereinshown, the soil penetrating plate has opposed wing portions 24' which extend diagonally aligned with one another and project to opposed sides of the soil penetrating head. These wing portions 24' extend in a common vertical plane with respect to the force transmission shaft 10. Restraining means in the form of a bushing 25 is immovably secured to the outer periphery of the force transmission shaft 10 to maintain the soil penetrating plates 16' about the shaft to prevent vertical displacement thereof with the shaft. As also shown in FIG. 1, the hook means may be provided by a through hole 26 formed in the soil penetrating plates 24' adjacent an outer edge thereof. As also shown in FIG. 1, the hollow force transmitting shaft 10 is composed of shaft sections threadedly interconnected together by a screw end portion 27 and a threaded bore portion 28 formed at adjacent ends of the force transmitting shaft portions, respectively.

Figure 2A:
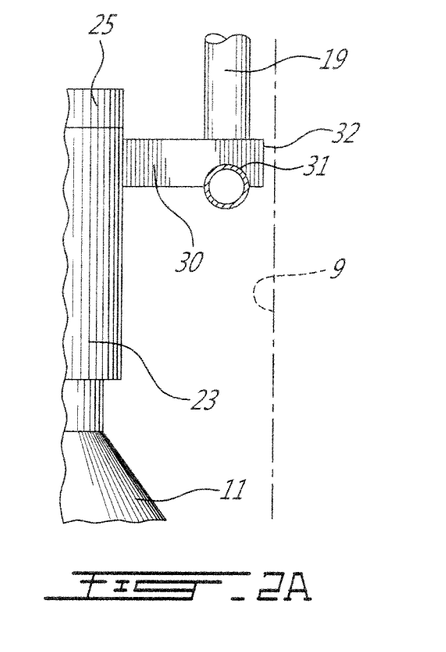
FIG. 2A is a fragmented side view showing a modification of the attachment means for the loop end portion of a flexible conduit loop.

Referring to FIG. 2A, there is shown an example of a further attachment means to secure the loop end portion of the flexible conduit loop to the force transmission shaft. As hereinshown, it is provided by a connecting arm projection 30 extending transversely from the sleeve 23 and provided with a hook formation 31 thereunder, adjacent the free end 32 thereof. The loop end portion 19 is secured thereto in a similar fashion as previously described with respect to FIG. 1. The arm 30 extends within the bore hole. The boring head 11 is preferably a detachable sacrificial boring head.

Figure 2B:
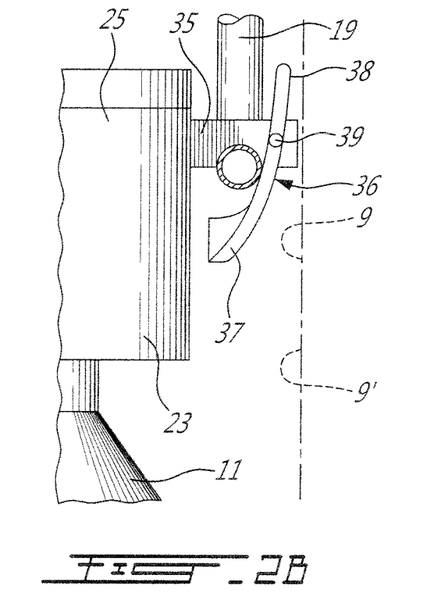
FIG. 2B is another fragmented side view showing another example of the attachment means for the loop and portion of a flexible conduit loop.

FIG. 2B shows another modification of the attachment means and as hereinshown, there is provided a connecting arm projection 35 also extending transversely to the sleeve 23 and having at a free end thereof a projection shield 36 which has a soil penetrating leading end formation 37. The shield 36 is pivotally connected to the arm 35 by a pivot pin 39. A projection extends behind the soil penetrating leading end formation to protect the loop end from material into the hole as it is being bored by the soil penetrating head 11. When the hollow force transmission shaft is withdrawn, the end formation 37 pivots towards the side wall 9' of the bore hole 9 to clear the loop end 19 and the connecting arm projection 35 is displaced along the space between the spaced-apart conduits 21 and 21' of the flexible conduit loop 20.

Figure 3A:
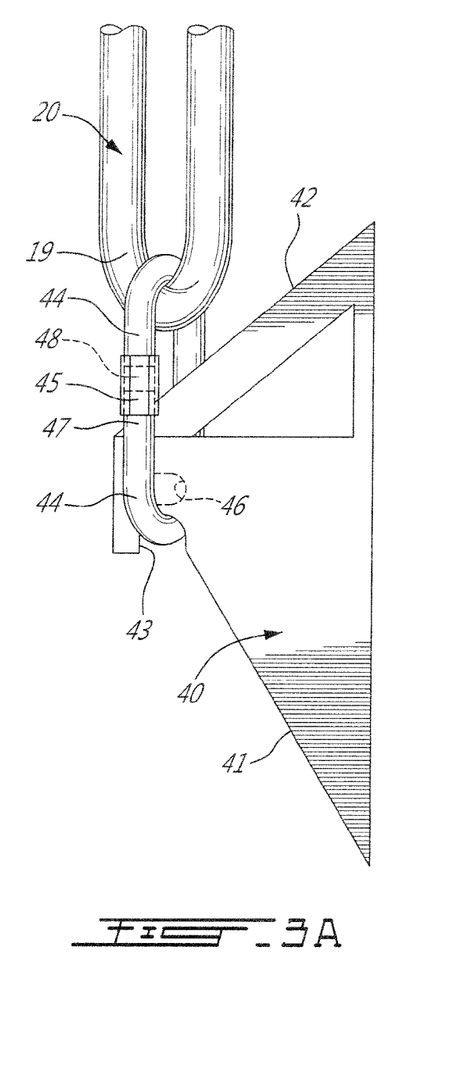
FIG. 3A is a fragmented side view showing a further embodiment of an attachment plate and wherein the conduit loop is connected to the attachment plate by a releasable interconnection.

Referring now to FIG. 3A, there is shown a still further embodiment of the attachment means and as hereinshown, there is provided a soil penetrating plate 40 as described in my co-pending application Ser. No. 12/497,560. This soil penetrating plate 40 is provided with an angulated leading edge 41 as well as an upwardly angulated rear edge 42 permitting easy insertion and withdrawal of the soil penetrating plate 40 into the soil. A hook formation 43 is provided in the top end portion of the leading edge 41 and it is adapted to receive a releasable interconnection means which is a connecting chain link 44. The chain link 44 is formed of a predetermined tensile strength whereby to break and disconnect when the tensile force therein is exceeded if the resistance or tension in one or two of the conduit loops being drawn exceeds the predetermined tensile force of the chain link 44. This prevents damage to the conduit loops and releases them at a depth where this resistance or tension in the loop exceeds the predetermined tensile force of the connecting chain link 44.

The conduit loop 20 can also be connected to a through bore 46 formed in the soil penetrating plate 40. To do so, the connecting chain link 44 of predetermined tensile strength is formed with a disconnectable portion in the form of a threaded sleeve 45, which is well known in the construction of chain link loops, wherein the threaded sleeve is rotated on a threaded portion 47 of the chain link 44 to provide access to a space 48 whereby the chain link 44 may be positioned within the through hole 46.

Figure 3B:
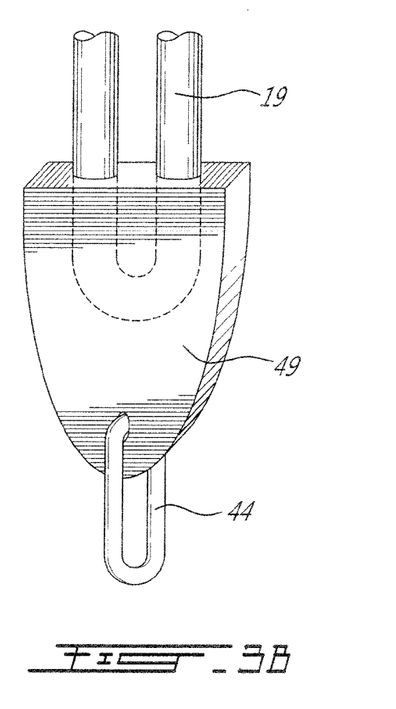
FIG. 3B is a fragmented perspective view showing a protection head secured to the loop end of the conduit loop.

FIG. 3B illustrates another embodiment wherein the loop end portion 19 is protected in a protective head casting 49, herein made of resin and shaped to be pulled into the soil by a soil penetrating plate or other means. A hole 49' is provided to secure the chain link 44 thereto. The protective head casting 49 could also be made by aluminum casted plates to sandwich the loop end portion 19 therebetween.

Figure 4:
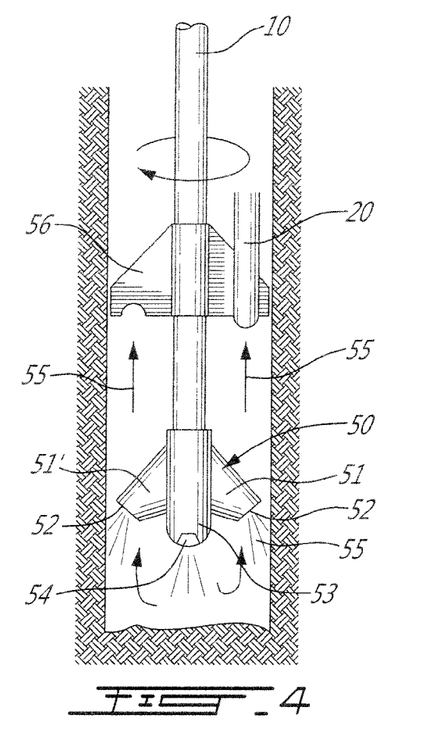
FIG. 4 is a simplified section view showing another configuration of the soil penetrating head for the installation of one or more flexible conduit loops into a hole being bored.
Figure 5:
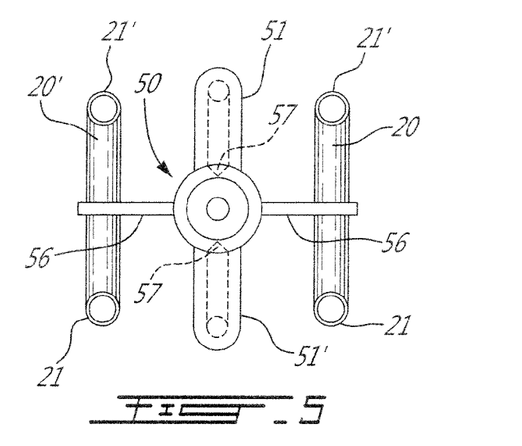
FIG. 5 is a simplified schematic top view of the soil penetrating head of FIG. 4 showing its orientation prior to being withdrawn from a bored hole.

Referring now to FIGS. 4 and 5, there is shown a further embodiment of the construction of the soil penetrating head. As hereinshown the soil penetrating head 50 is a retractable rotating head formed by two or more branch arms 51 and 51', each provided with a nozzle 52 and 52' respectively, which constitutes the conduit means for release of the pressurized medium therefrom. Each of the branch arms 51 and 51' extend at a downward angle and spaced in a common plane (see FIG. 5) whereby it can be retracted without interference with the flexible conduit loops released in the bore hole when oriented at a predetermined position parallel to the conduit loops 20 and 20', as shown in FIG. 5. The orientation of the branch arms 51 and 51' is determined from the top of the bore hole by suitable means, such as a position indication marking 57 on the force transmission shaft. As also hereinshown, there is provided a central branch arm 53 which extends axially with the hollow force transmission shaft 10 and is also provided with a nozzle end 54. Accordingly, the pressurized medium 55 is released in a cone to excavate the soil thereunder and release the soil upwards in the direction of arrows 55 towards a top end of the bore hole.

As also shown in FIG. 4, the soil penetrating plate 56 positions the conduit loops 20 behind the bore head 50. As shown in FIG. 5, the branch arms 51 and 51' lie in a common diametrical plane and when withdrawing the soil penetrating head 50, it is firstly positioned substantially parallel to the conduit loops 20 and 20' whereby not to interfere with these as the soil penetrating head 50 and the soil penetrating plate 56 is withdrawn. The soil penetrating plate is withdrawn in the area between the spaced-apart conduits 21 and 21' of the conduit loops 20 and 20'.

Figure 6:
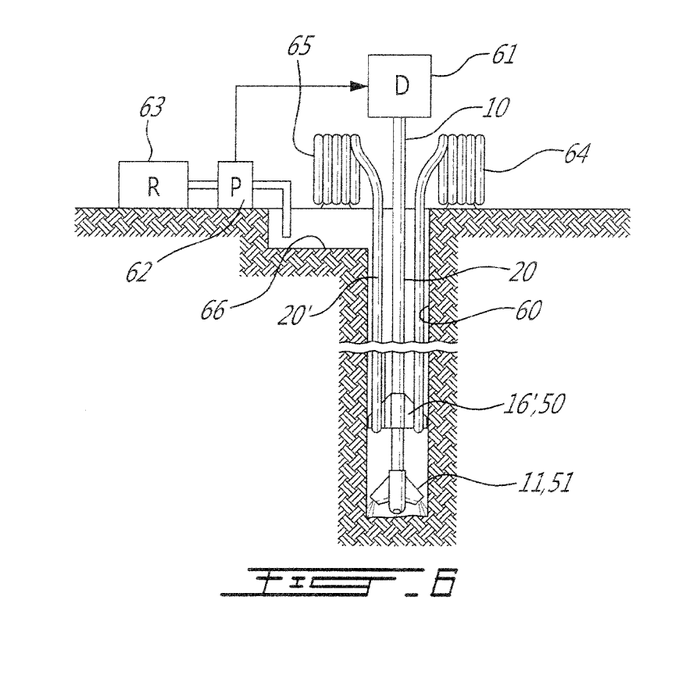
FIG. 6 is a simplified schematic view illustrating the recovery of pressurized bentonite cement solution during the boring process of the soil penetrating head into the soil.

Referring now to FIG. 6, there is schematically illustrated a typical method of installation of the geothermal flexible conduit loops 20 and 20' in a bore hole 60 as it is being formed by the soil penetrating head 11 or 51, in a single pass. A suitable rotation and/or percussion drive 61 is secured to a top end portion of the hollow force transmitting shaft and a pressurized medium is fed into the hollow shaft by a pump 62 connected to a supply reservoir 63. The flexible geothermal conduit loops 20 and 20' are wound on spools 64 and 65, respectively, and positioned on opposed sides of the bore hole 60. At a convenient location beside the top end of the bore hole 60, there is provided a medium collection basin 66 for collection of a backflow of the pressurized medium for re-injection into a top end of the hollow force transmitting shaft by the pump 62, if such medium is, for example, bentonite cement solution or other similar chemical mixtures which are left in the bore hole to harden whereby to immovably secure the conduit loops therein. The medium may also be air, water or other liquids.

Figure 7A:
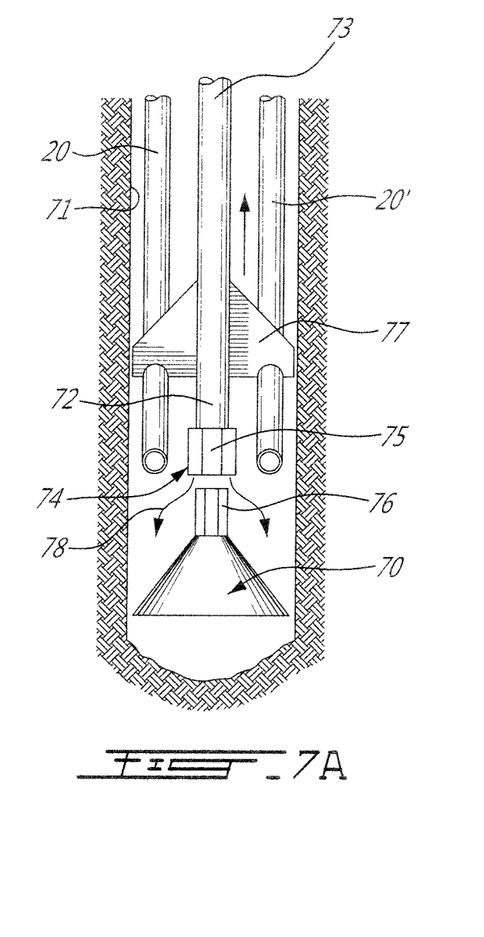
FIG. 7A is a simplified schematic view illustrating the use of a sacrificial bore head which is releasable at the bottom of the bore hole.
Figure 7B:
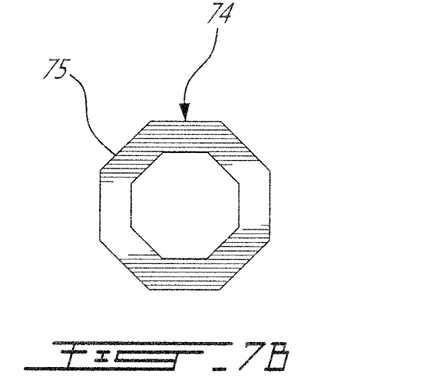
FIG. 7B is an end view of the coupling.

Referring now to FIGS. 7A and 7B, there is illustrated an embodiment wherein the boring head 70 is a sacrificial boring head, that is to say it is released in the bore hole 71 when reaching the desired boring depth. For this purpose, the lower end 72 of the boring shaft 73 is provided with a coupling 74 which may have a hexagonal shape 75 to import rotation to the boring head 70 through its hexagonal connector 76. As the boring head descends to bore through the soil, the force on the shaft 73 keeps the coupling 74 engaged with the shaft 76 of the boring head. When reaching the bottom of the bore hole, the shaft 73 is retracted and the coupling releases the boring head 70 and retracts the soil penetrating mechanism 77 which engaged with the conduit loops 20 and 20' to draw them in the bore hole being formed in a single pass. With the bore head 70 disconnected there is no possible damage to the conduit loops by having to retract this type of bore head, the circumference of which spans the position of the conduit loops in the bore hole. Also, as hereinshown, bentonite cement is controllably released in the bore hole 71 from the open end of the shaft 73 as it is retracted and as illustrated by arrows 78.

It is within the ambit of the present invention to cover any obvious modifications of the preferred embodiment described herein provided such modifications fall within the scope of the appended claims.

I claim:

1. A geothermal flexible conduit loop installation system for installing a flexible conduit loop in dense soil or rock in a single pass, comprising:
   a hollow force transmission shaft having a soil penetrating head secured to a boring end of said shaft;
   two or more nozzles in said soil penetrating head in communication with a passageway formed in said hollow force transmission shaft for the passage of a pressurized medium therein;
   a plate or projection secured to said hollow force transmission shaft behind said soil penetrating head and including a hook formation configured to engage a loop end portion of the flexible conduit loop and draw the flexible conduit loop in a bore hole being formed by said soil penetrating head as it descends in a soil under the influence of a downward force applied to said hollow force transmission shaft, said medium being released in said bore hole as it is formed; and
   wherein said hook formation is radially spaced from the force transmission shaft such that the radial distance from the transmission shaft to the hook formation is greater than the radial distance from the transmission shaft to the outer periphery of the soil penetrating head; and wherein said soil penetrating head is withdrawable from said bore hole without interference with said flexible conduit loop retained in said bore hole by surrounding soil and/or said pressurized medium.

2. A geothermal flexible conduit loop installation system as claimed in claim 1 wherein said medium is one of air, water, or a bentonite cement solution.

3. A geothermal flexible conduit loop installation system as claimed in claim 1 for installing an additional flexible conduit loop together with the flexible conduit loop, the system further comprising an additional hook formation configured to engage a loop end portion of the additional flexible conduit loop, the hook formation and additional hook formation being each provided on a respective one of opposed sides of said soil penetrating head.

4. A geothermal flexible conduit loop installation system as claimed in claim 1 wherein said plate or projection is a soil penetrating plate secured to said hollow force transmission shaft by a sleeve having a bearing support connection, the bearing support connection preventing a rotation of said force transmission shaft from being transmitted to said soil penetrating plate, and a bushing maintains said soil penetrating plate about said shaft to prevent vertical displacement thereof with said shaft.

5. A geothermal flexible conduit loop installation system as claimed in claim 4 wherein said hook formation is defined in a lower transverse edge of said soil penetrating plate, said hook formation being configured to receive therein a circumferential portion of said loop end portion or a releasable interconnection engaged to said loop end portion.

6. A geothermal flexible conduit loop installation system as claimed in claim 1 wherein said loop end portion is secured to said hook formation by a releasable interconnection which releases said conduit loop into said bore hole when a resistance force of said conduit loop exceeds a predetermined force.

7. A geothermal flexible conduit loop installation system as claimed in claim 6 wherein said releasable interconnection is a retention element having at least a portion thereof formed of a predetermined tensile force to disconnect when said tensile force is exceeded.

8. A geothermal flexible conduit loop installation system as claimed in claim 7 wherein said retention element is a ring having a connection for securement about said loop end portion of said flexible conduit loop and said hook formation.

9. A geothermal flexible conduit loop installation system as claimed in claim 8 wherein said plate or projection is a soil penetrating plate, said hook formation being formed in a lower transverse edge of said soil penetrating plate.

10. A geothermal flexible conduit loop installation system as claimed in claim 8 wherein said plate or projection is a soil penetrating plate, said hook formation being a through hole formed in said soil penetrating plate adjacent an outer edge thereof.

11. A geothermal flexible conduit loop installation system as claimed in claim 1 wherein said plate or projection is a soil penetrating plate, said soil penetrating plate having two opposed wing portions extending diagonally aligned with one another and projecting to opposed sides of said soil penetrating head, said wing portions extending in a common vertical plane with respect to said force transmission shaft, said hook formation being defined in one of the wing portions, and an additional hook formation being defined in the other of the wing portions.

12. A geothermal flexible conduit loop installation system as claimed in claim 11 wherein said hook formation and said additional hook formation are each defined by a respective hole formed in each said wing portions adjacent an outer edge thereof.

13. A geothermal flexible conduit loop installation system as claimed in claim 1 wherein said plate or projection further includes a protection shield having a soil penetrating leading end formation, said hook formation being defined by a hook secured behind said shield.

14. A geothermal flexible conduit loop installation system as claimed in claim 1 wherein said soil penetrating head is a retractable rotating head formed by two or more rotatable branch arms, each branch arm including a respective one of the nozzles for release of said pressurized medium, at least one of said branch arms extending at a downward angle whereby it can be retracted without interference with said flexible conduit loop released in said bore hole when oriented at a predetermined position.

15. A geothermal flexible conduit loop installation system as claimed in claim 14 wherein there are two of said branch arms disposed on opposed sides of a central branch arm which extends axially with said hollow force transmission shaft, said central branch arm having a nozzle end.

16. A geothermal flexible conduit loop installation system as claimed in claim 15 wherein said plate or projection is a soil penetrating plate, said soil penetrating plate being secured to said hollow force transmission shaft by a sleeve having a bearing support connection, the bearing support connection preventing a rotation of said force transmission shaft from being transmitted to said soil penetrating plate, and a bushing maintains said soil penetrating plate about said shaft to prevent vertical displacement thereof with said shaft.

17. A geothermal flexible conduit loop installation system as claimed in claim 16 wherein said hook formation is formed in a lower transverse edge of said soil penetrating plate, said hook formation being configured to receive therein a circumferential portion of said loop end portion or a releasable interconnection engaged to said loop end portion.

18. A geothermal flexible conduit loop installation system as claimed in claim 17 wherein said soil penetrating plate has opposed wing portions extending diagonally aligned with one another and projecting to opposed sides of said soil penetrating head, said wing portions extending in a common vertical plane with respect to said force transmission shaft, said hook formation being located in said bore hole.

19. A geothermal flexible conduit loop installation system as claimed in claim 1 further including a medium collection basin adjacent a top end of said bore hole for collection of a backflow of said medium for re-injection into a top end of said hollow force transmission shaft.

* * * * *